United States Patent
Nishida et al.

(10) Patent No.: US 6,763,346 B1
(45) Date of Patent: Jul. 13, 2004

(54) DOCUMENT SERVICE INTEGRATED SYSTEM

(75) Inventors: Kenichi Nishida, Kawasaki (JP); Kyosuke Yanai, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 437 days.

(21) Appl. No.: 09/722,725

(22) Filed: Nov. 28, 2000

(30) Foreign Application Priority Data

Feb. 4, 2000 (JP) ........................................ 2000-026880

(51) Int. Cl.[7] .......................... G06F 17/30; G06F 12/00
(52) U.S. Cl. .......................................... 707/2; 707/203
(58) Field of Search .............................. 707/1–3, 9–10, 707/100–102, 103; 705/50–51

(56) References Cited

U.S. PATENT DOCUMENTS

2002/0073080 A1 * 6/2002 Lipkin ............................ 707/3

FOREIGN PATENT DOCUMENTS

| JP | A-8-161393 | 6/1996 |
| JP | A-8-320901 | 12/1996 |
| JP | A-9-282250 | 10/1997 |
| JP | A-10-105623 | 4/1998 |
| JP | A-10-111888 | 4/1998 |
| JP | A-10-326314 | 12/1998 |

* cited by examiner

Primary Examiner—Alford Kindred
(74) Attorney, Agent, or Firm—Oliff & Berridge, PLC

(57) ABSTRACT

Existing diverse applications and databases are integrally managed by mutually connecting them to achieve centralized management of documents. A first interface part is constituted by an API service and establishes an interface between a management system and a business application. WEB browsers and a WEB server establish a user interface. A second interface part establishes an interface between the management system and business databases. The management system carries out service management and document management according to various definitions based on document models and process models. Plural services having existed independently so far are integrated and plural documents are managed as a document set in units of business processes.

15 Claims, 6 Drawing Sheets

DOCUMENT SERVICE INTEGRATED SYSTEM

BACKGROUND OF THE INVENTION

1. Field of the Invention

The present invention relates to a document service integrated system, and more particularly to a system that allows diverse business documents managed by plural databases to be used among plural clients according to business processes.

2. Description of the Prior Art

A series of activities, for example, in the manufacturing and sales of products has plural processes. For example, the series of activities has proposal and planning, design, approval, production, distribution, sales, support, and other processes. Generally, there are many cases where each process is committed to a different section and a different system is installed for each section. For example, in a design section, a system to treat design drawings is installed, and in a sales section, a system to manage operation information including sales information and other information is installed.

Although, recently, with the widespread use of an Intranet, systems within a company are being physically integrated, there is not yet provided a system that integrates diverse systems on a series of business processes and can comprehensively support all business processes.

By the way, as a method of managing business processes, a so-called workflow system is known. This method successively transfers given documents (nucleus business documents) between processes, thereby managing the progress of activities. For example, for a design change activity, a predetermined request sheet is first created as a document, and by circulating it, design, approval, and other processes precede in a step-by-step manner. Although such a document is usually circulated as paper among persons in charge, recently, the approach of circulating it in the format of electronic document by using electronic mail is also adopted. In either case, the nucleus of activity progress is the document and the location or status of the document reflects the progress of the activity.

The above-described business documents is often provided with various data such as related documents, statistical information, and drawings. However, as described above, conventionally, since a series of business processes has been built on plural services, more specifically, on applications (application programs) or databases (database systems), it has been difficult to share and exchange information between individual systems. Accordingly, actually, it has been a common practice to print information related to an activity concerned as required and attach it.

Of course, if software for connecting the systems is created among them, connections among the individual systems could be established. However, such customization would require much cost and cause difficulties in flexible accommodation to specification change of the individual systems.

A workflow management system is disclosed in Japanese Published Unexamined Patent Application No. Hei 10-326314. In the system, a document to be processed is electronically circulated among persons in charge according to flow control information including processing contents, procedure, persons in charge, process definitions describing the rules for deciding them, document circulation status, and processing status. The process definitions are referred to when shifting the status of the document.

Also, there is disclosed in Japanese Published Unexamined Patent Application No. Hei 9-282250 that a document circulation route is described in an electronic document. Systems supporting a workflow are disclosed in Japanese Published Unexamined Patent Application Nos. Hei 8-320901 and No. Hei 10-111888.

Furthermore, hierarchical creation of a workflow is disclosed in Japanese Published Unexamined Patent Application No. Hei 10-105623, and in Japanese Published Unexamined Patent Application No. Hei 8-161393, items for relating not specific persons directly to but abstract roles to activities are disclosed.

However, none of the above-described literatures describes centralized management of various documents with business processes in mind and flexible data exchange between applications or clients using them and databases.

SUMMARY OF THE INVENTION

The present invention has been made in view of the above circumstances and provides a document service integrated system that integrates diverse document services (systems) concerned in business processes, supports the business processes, and implements rational document processing.

The present invention also provides a document service integrated system that integrally manages a variety of existing applications and databases by mutually connecting them, thereby achieving promotion of document use and centralized management of documents.

(1) The present invention is a system provided between at least one client to use documents and at least one database to manage the documents. The system includes a management part having a control part that integrally manages various documents managed by the database according to business processes and a processing part that processes document operation requests from the clients, a first interface part that establishes an interface between the clients and the management part, and a second interface part that establishes an interface between the databases and the management part.

According to the above-described configuration, a document service integrated system is provided between at least one client and at least one database (database system), and by the integrated system, services (that is, various applications (application programs) and various databases used on the clients) are integrated on a network. Plural documents managed by the database are integrally managed according to business processes.

An interface between the management part and clients (applications used in the client in basic mode) is established by the first interface part, and this means enables any number of various clients (or applications) to be connected so long as an interface complying with the first interface part is available. An interface between the management part and databases is established by the second interface part, and this means enables any number of various databases to be connected so long as an interface complying with the second interface part is available. Here, for each of the databases to be connected, it is desirable that a facility handler to individually establish an interface between the database and the management part can be plugged in. In this configuration, the second interface part is configured with as many facility handlers as the number of databases to be integrated in the system or the number of types of the databases.

According to the above-described configuration, plural systems can be linked with each other to create a new business system. Moreover, a variety of documents managed by different types of plural databases can be integrally managed based on business processes. That is, plural distributed documents are managed in centralized manner so that they can be used by many clients. Therefore, since various documents on the system appear to the clients as if they were managed by a single database, a standardized access means can be provided to individual clients. Particularly, the above-described configuration allows existing systems (services) to be used without modifications, bringing about a cost advantage and providing excellent flexibility and expandability for the system. For example, the sharing of information within a company is further promoted.

The concept of documents contains various electronic multimedia data (particularly text data, drawing data, image data, and other data used in business). Various applications can be constituted as part of a document service integrated system or resources managed by it. In this case, the applications can be shared among plural clients. In this case, documents are manipulated by the applications on the document service integrated system and the execution results can be provided to the clients, or functions of all or part of applications on the document service integrated system may be transferred to the clients to process the documents by processing functions on the clients. Alternatively, from the beginning, applications necessary to individual clients may be installed to pass documents to the applications for processing. In short, system configurations may be changed as required according to various conditions.

(2) Preferably, in the configuration described in (1), the control part has a first table in which definitions to associate plural documents are stored for each business process, and the processing part processes the document operation requests according to the association definitions.

With the above-described configuration, for each business process, plural documents (e.g., proposals, initial design drawings, changed design drawings, manuals, directions, management information, etc.) relating to the business process are mutually associated. That is, a document set for each business process is created.

(3) Preferably, in the configuration described in (2), the processing part has the function of searching documents according to the association definitions. With the configuration, according to the association definitions, from a particular document, documents related to it can be searched for, or all documents used in a particular business process can be searched for. Of course, in such searches, the clients need not consider the actual locations and registration attributes of the documents.

(4) Preferably, in the configuration described in (2), the processing part has the function of collectively printing plural documents mutually associated, according to the association definitions. The configuration enables all or part of plural documents relating to a particular business process to be collectively printed, heavily reducing loads on the users.

(5) Preferably, in the configuration described in (1), the control part has a second table in which status transition definitions in business processes are stored, and the processing part processes the document operation requests according to the status transition definitions. With this configuration, the statuses of business processes can be managed based on documents in place of a conventional approach based on humans (persons in charge).

(6) Preferably, in the configuration described in (5), the control part has a third table in which correspondences between role names and user names are defined, the status transition definitions can contain the role names, and the processing part processes the document operation requests according to the status transition definitions and the correspondences. The configuration enables status transition conditions to be described by abstract role names. Accordingly, even if a person in charge is changed, only the contents of the third table need to be modified. The role name here refers to an abstract name such as a creator, an approver, a manager, a person in charge of input-output operations, and a user. The user name refers to, e.g., a concrete person name (or its ID) or the name of a group including them as members.

(7) Preferably, in the configuration described in (1), the control part has a fourth table in which definitions of data format conversion among plural applications are stored, and the processing part, according to the definitions of data format conversion, converts a document of a first data format created by a first application to a document of a second format and passes the document of the second data format to a second application. The configuration enables each application to always receive documents of a data format it can process. The results can be used in the clients.

(8) Preferably, in the configuration described in (1), the control part has a fifth table in which publicity range definitions for each document are stored, and the processing part limits access to documents according to the publicity range definitions. The configuration enables a publicity range to be freely set according to the contents of business processes and the nature of documents, providing security for the documents.

(9) Preferably, in the configuration described in (1), the management part has a log recording part that records logs on a series of document operations in business processes. According to the configuration, since logs on each operation are recorded, the business processes can be improved by analyzing the logs.

(10) The present invention also provides a system that can connect documents to plural clients using them on various applications, and to plural databases managing the documents. The system includes a management part having a control part that integrally manages various documents managed by the databases according to business processes and a processing part that processes document operation requests from the clients, a first interface part that establishes an interface between the applications and the management part, and a second interface part that establishes an interface between the databases and the management part.

According to the above-described configuration, a desired number of applications and a desired number of databases can be connected, and by integrating their services, various documents existing in the plural databases can be managed in centralized manner.

(11) Preferably, with the configuration of (10), the first interface part has the function of interpreting instructions following predetermined application interface rules.

(12) Preferably, in the configuration described in (10), the second interface part is constituted of plural facility handlers provided corresponding to individual databases.

(13) Preferably, the above-described management part is constituted by software as middleware. The first interface part and the second interface part are also constituted by software. The software is stored in a storage device on a computer system and executed by the CPU. The software may be installed in the storage device by portable media and communications.

BRIEF DESCRIPTION OF THE DRAWINGS

A preferred embodiment of the present invention will be described in detail based on the followings, wherein.

DESCRIPTION OF THE PREFERRED EMBODIMENT

Hereinafter, a preferred embodiment of the present invention will be described based on the accompanying drawings.

Figure 1:
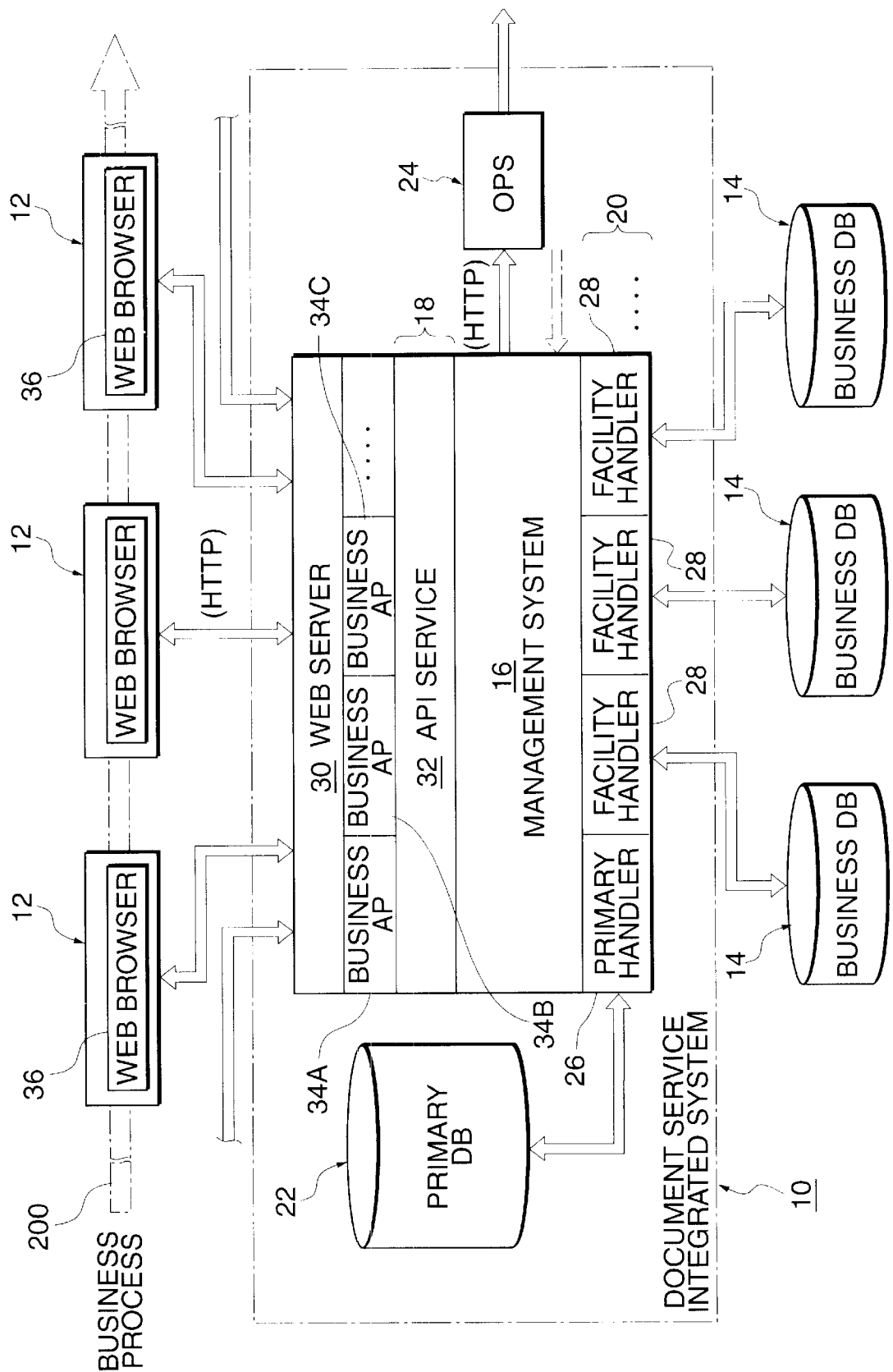
FIG. 1 is a diagram showing the concept of a document service integrated system of the present invention.

FIG. 1, which shows a preferred embodiment of a document service integrated system according to the present invention, is a schematic view showing an overall configuration of the document service integrated system.

In FIG. 1, a document service integrated system 10 is a system that integrates plural services (systems) used in one or plural business processes on a network and integrally manages plural documents related to the business processes. As shown in the drawing, plural client systems 12 and plural business databases 14 are connected to the document service integrated system 10.

Each client system 12 has a WEB browser 36. A user interface is formed by both the WEB browsers 36 and a WEB server 30 to be described later.

As will be described later, to carry out a business process 200, plural business applications 34A, 34B, and 34C of the same type or different types are used. The business applications 34A, 34B, and 34C, in an embodiment shown in FIG. 1, constitute part of the document service integrated system 10 or are integrally managed by the system 10.

Functions of all or part of the business applications can be transferred to the client 12 as required, documents can be processed using the processing functions of the clients 12, or applications necessary for the clients 12 can be installed from the beginning.

To carry out a business process, plural documents managed by plural business databases 14 of the same type or different types are used. Such plural databases 14 are integrally managed by the document service integrated system 10, as described above.

The document service integrated system 10, in an example shown in FIG. 1, includes: a management system 16; a first interface part 18 (an API service 32 in this example); one or plural applications 34A, 34B, and 34C; a WEB server 30; a second interface part 20; a primary database 22; and an output service (OPS) 24. As required, an input service (not shown) and others may be provided.

The WEB server 30, as described above, constitutes a user interface together with the WEB browsers 36. To be more specific, the WEB server 30 offers services such as document browsing according to directions from the WEB browsers 36. The HTTP protocol is used for communications between the WEB server 30 and the WEB browsers 36.

The plural business applications 34A, 34B, and 34C are programs for performing document processing on business processes, and different types of applications can be installed on the system 10. Document operation instructions from the client systems 12 are passed to the applications 34A, 34B, and 34C via the WEB server 30, as described above. The business applications 34A, 34B, and 34C can acquire documents existing in one of the business databases 14 by calling API provided by the API (application program interface) service 32. The intervention of the API service 32 enables the business applications 34A, 34B, and 34C (the client systems 12 also) to acquire required documents in a required format without considering the locations and attributes of the documents. Also, format differences between the applications are accommodated by the API service 32.

In this way, the business applications 34A, 34B, and 34C provide desired services by processing and interpreting operation requests received through the WEB browsers and calling API. In other words, to perform document processing in the business applications 34A, 34B, and 34C, the API service 32 provides an interface for operations such as document calling and registration, document searching, log management, and the like. For some operations on documents in the client machines 12, commands following predetermined API rules are specified and the commands are interpreted by the API service 32. Specifically, services from the management system 16 having accepted the interpretation result are received.

Of course, the configuration of the first interface part 18 shown in FIG. 1 is merely an example; apart from this configuration, other interface modules can be used so long as an interface can be established between the management system 16 and the business applications 34.

On the other, the second interface part 20 establishes an interface between the management system 16 and the business databases 14. In this embodiment, an interface (service program interface (SPI)) is established by a facility handler 28 provided for each of the business databases 14. The facility handlers 28 are configured so that those suited for the business databases 14 can be added by a plug-in method. Accordingly, even if different types of business databases coexist, by adding facility handlers 28, their business databases can be managed in centralized manner by the management system 16.

By the way, a primary handler 26 is a dedicated facility handler for establishing an interface with a primary database 22 making up the document service integrated system 10.

Therefore, according to the above-described second interface part 20, for example, plural existing business databases within a company can be integrated for centralized management. In short, different types of data such as text data, drawing data, or image data can be collectively managed.

OPS 24 is a service that outputs document data in response to a request from the management system 16. For example, when document sets to be described later are printed, the OPS 24 functions.

The management system 16 is a system that, in this embodiment, integrally manages plural documents for each business process according to various abstraction models such as data (document) model, process model, user model, area model, and interchange model. The management system 16 has diverse functions, representative examples of which are shown as a block diagram in FIG. 2. By the way, definitions based on the above-described models are stored on the primary database 22 and concrete examples of the definitions will be described later using FIG. 3.

Statuses in business processes have been conventionally managed based on humans, while, in this embodiment, statuses on business processes are managed based on documents. This will be described in detail later.

Figure 2:
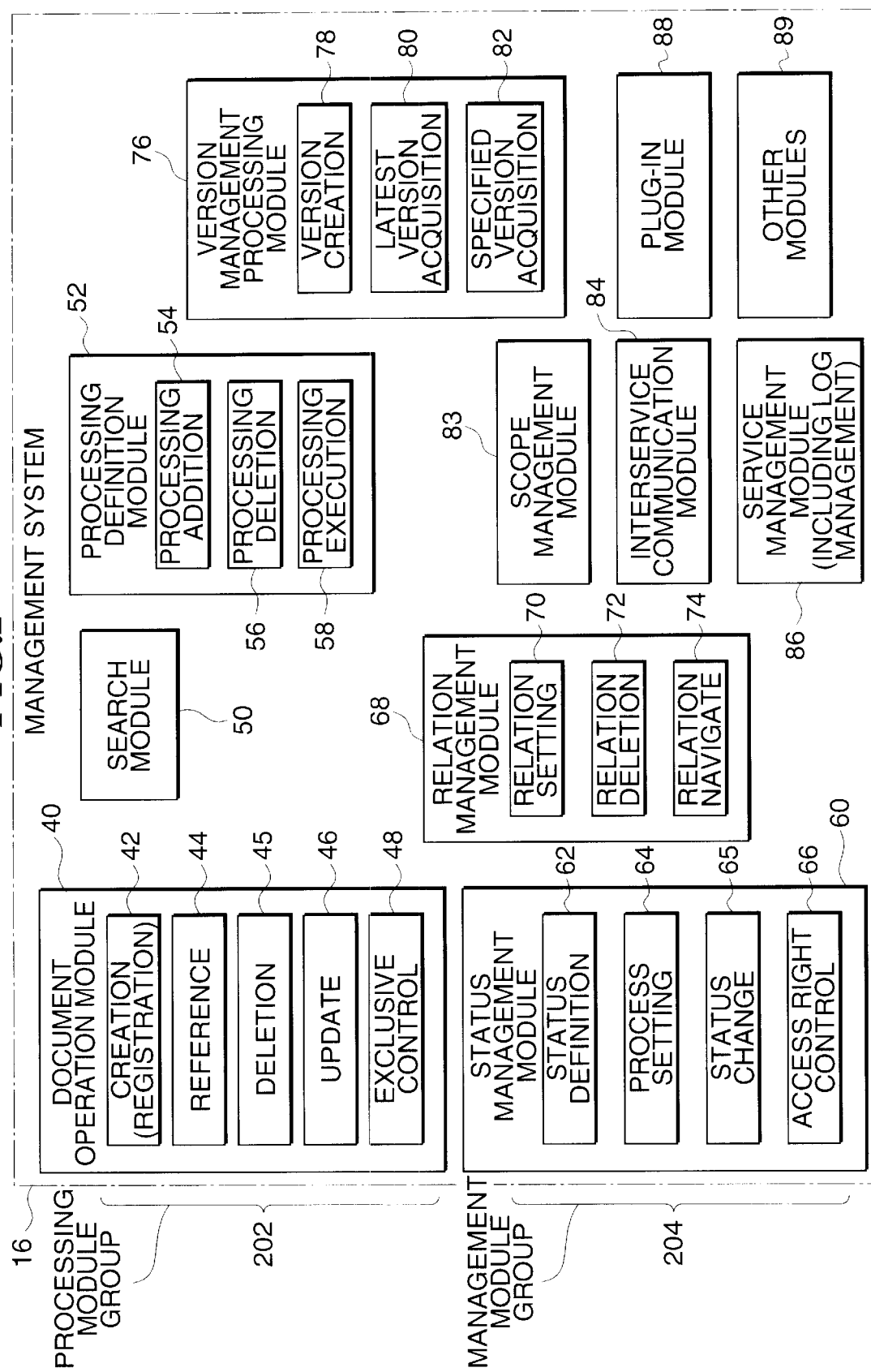
FIG. 2 is a block diagram showing a concrete configuration of a management system shown in FIG. 1.

In FIG. 2, the management system 16 shown in FIG. 1 primarily includes a processing module group 202 and a management module group 204. Each of modules described below does not belong wholly to one of the processing module group 202 and the management module group 204 and has both processing functions and management functions.

First, a document operation module 40 is described. A creation (registration) function 42 of the document operation module 40 creates a document set including one or plural documents formed in units of business processes. A reference function 44 references the contents and attributes of a document to which a reference request is issued. A deletion function 45 deletes a registered document set. An update function 46 changes the attributes of a document set. An exclusive control function 48 temporarily blocks other editing by the so-called check-in, check-out operation when editing a document set.

A search module 50 searches documents by using any attribute they have. For example, all or part of plural related documents used in a particular business process can be searched for, or other documents can be searched for from documents belonging to a business process. Information searching or full-text searching within documents can be carried out only when a facility or database storing the documents has that function.

A processing definition module 52 defines processing for documents and performs the processing. A processing addition function 54 adds processing for documents. A processing deletion function 56 deletes processing already defined. A processing execution function 58 performs registered processing.

A status management module 60 defines conditions of status transition on business processes of document sets and controls access right for documents, based on the conditions. Specifically, a status definition function 62 defines the possible statuses of document sets and transitions among them. A process setting function 64 specifies based on which process a document set shifts in status. A status change function 65 changes the status of document sets. An access right control function 66 controls executable processing for each of the statuses of document sets.

A relation management module 68 holds relations among documents constituting a document set and gains access to related documents by following the relations as required. A relation setting function 70 of it sets relations among plural documents within a framework of a document set. A relation deletion function 72 deletes relations among documents. A relation navigate function 74 references relations already set and gains access to related documents.

A version management processing module 76 holds a change history of document sets. A version generation function 78 generates a new version, and a latest version acquisition function 80 acquires the latest version of a specified document. A specified version acquisition function 82 acquires a specified version of a specified document.

A scope management module 83 sets a search range and a publicity range of documents. An interservice communication module 84 performs communications among components constituting the system. It includes a data transfer function also.

A service management module 86 has the function of starting and halting services, the function of recording errors, the function of recording various operations, and the function of backing up data.

A plug-in module 88 functions when adding the facility handler 28 shown in FIG. 1. The modules shown in FIG. 2 are an example; other various modules 89 can also be installed.

According to the above-described management system 16, it is assumed that interfaces are established at two sides by the first interface part 18 and the second interface part 20, documents existing on one of the databases 14 can be freely handled, and various document operation requests from the client systems 12 can be accommodated with corresponding services. Particularly, when a request to acquire a document set relating to the business processes 200 is made through a business application from a client system 12, plural documents constituting the document set are acquired from the plural business databases 14 by the management system 16 and provided to the client system 12 through applications or the like. Therefore, the client system 12 can reference desired documents without considering the locations and registration attributes of the documents, and the sharing of information can be further promoted.

The management system 16 abstractly manages various data, based on data (document) models and process models as described above. Hereinafter, data managed in this way is described using FIG. 3.

Figure 3:
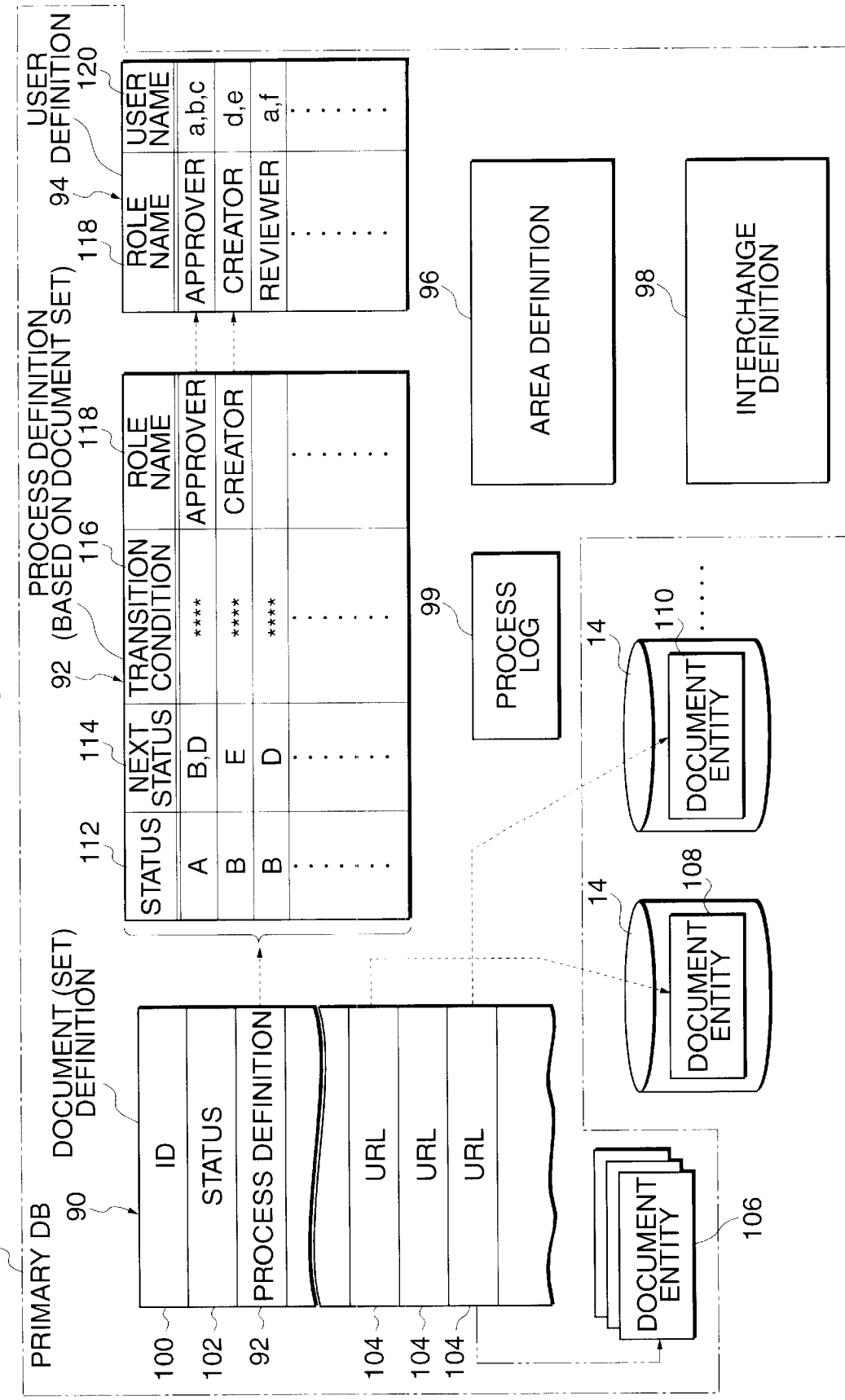
FIG. 3 is a diagram showing the structure of data on a primary database shown in FIG. 1.

FIG. 3 shows a configuration of data managed by the management system 16. Particularly, the structure of data stored on the primary database 22 is shown. The data structure shown in FIG. 3 is an example, and of course, other various data structures can also be adopted.

In FIG. 3, a document (set) definition 90 is created for each business process, based on a document model. By the document definition 90, plural documents used in a given business process are defined as a document set and the document set is managed in association with the business process. Specifically, ID 100 is the identifier of a document set and a status 102 is the current status of the document set, that is, the current status of the business process. A process definition 92 has a structure to be described later, and the process definition 92 is directly associated with the document definition 90, whereby process management is implemented on a document base.

URL 104 is a pointer indicating the location of each of documents constituting the document set. For example, by URL 104, the addresses of document entities 108 to 110 are specified, and by URL 104, the address of a document entity 106 existing in the primary database 22 is specified.

By the way, the document definition 90 primarily includes system attributes defined in advance on the system and user attributes defined by users, and various information can be managed using the latter attributes. That is, the document definition 90 as shown in FIG. 3 is an example.

A process definition 92 is directly associated with the document definition 90, as described above, and is created based on a process model. A status 112 indicates each status in the business process, that is, the status of a document, and the next status 114 indicates a status to shift to when a transition condition 116 is satisfied. A role name 118 is defined by a user definition 94 to be described later.

Therefore, according to the process definition 92, a certain status does not shift to the next status unless a user satisfying the role condition 118 performs an operation satisfying the transition condition 116. This enables process management and at the same time provides access limitation.

A user definition 94 defines correspondences between role names 118 and user names 120. The role names 118 are the abstract names of persons in charge and the user names 120 are concrete user names or user IDs, or the name of a group of the concrete user names or its ID. Such a user definition 94 is created according to a user model.

Figure 4:
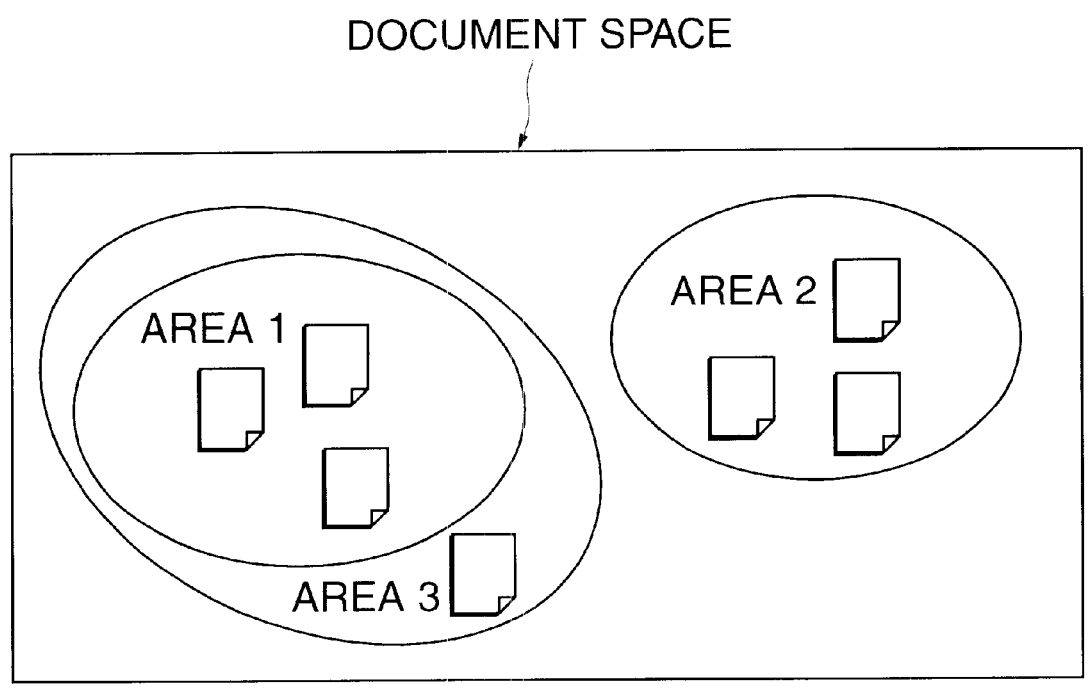
FIG. 4 is a diagram showing an example of area definition.

A process log 99 is equivalent to the recording of various operations on documents that were performed, on a business process basis, on a specified business process. An area definition 96 defines the publicity range and search range of documents according to an area model. For example, in FIG. 4, plural areas can be hierarchically allocated within the highest level document space and access limitation can be made using such an area definition.

An interchange definition 98 defines data format conversion between applications and is created according to an interchange model. Use of such an interchange definition 98 enables various applications to receive documents in a data format conforming to them. If other document sets are specified as URL 104 in the document definition 90, a so-called nesting state of document sets can be formed so that hierarchical management can be performed among the document sets.

As described above, the configuration example shown in FIG. 3 is an example for explaining an embodiment, and in configuring an actual system, objects are hierarchically managed so that definitions conforming to individual models can be formed.

The document operation module 40 shown in FIG. 2 performs processing using the document definition 90 and the like shown in FIG. 3. The search module 50 performs processing using the document definition 90, the area definition 96, and the like. The status management module 60 primarily handles the process definition 92. The relation management module 68 performs processing related to the document definition 90. Other modules shown in FIG. 2 also reference and use the information shown in FIG. 3 to perform their functions.

Figure 5:
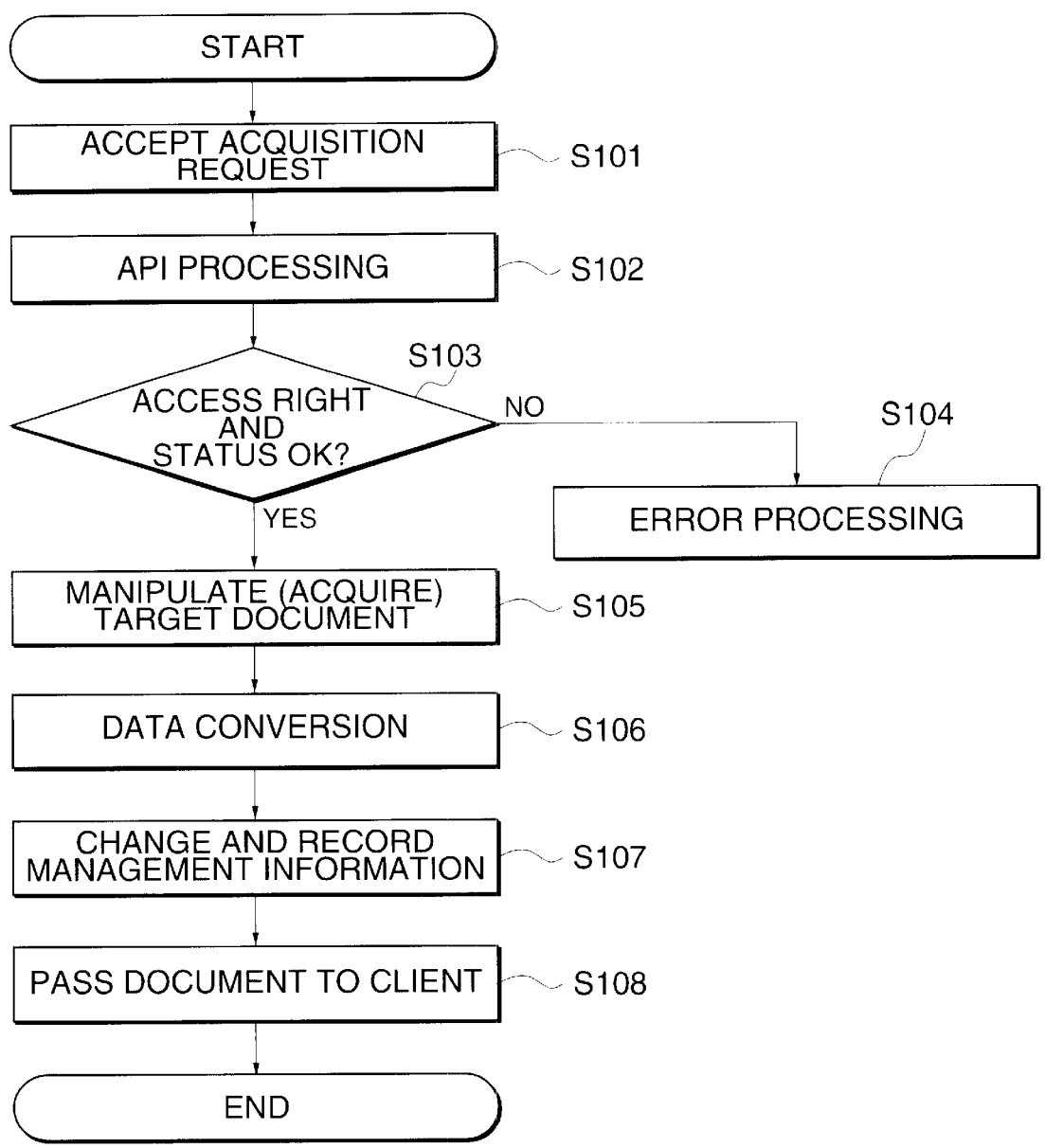
FIG. 5 is a flowchart showing document acquisition processing.
Figure 6:
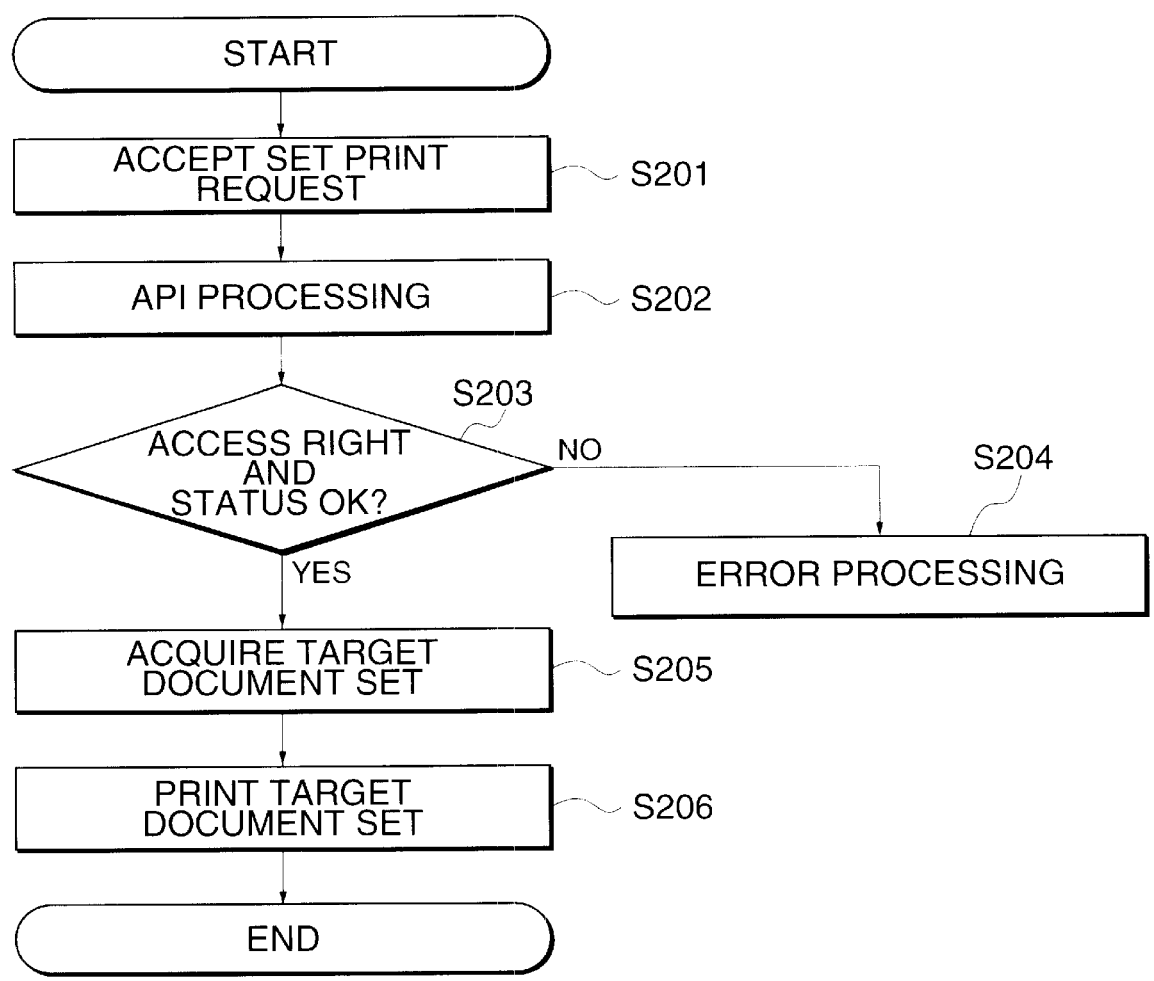
FIG. 6 is a flowchart showing document set printing.

Next, a representative processing example of the management system 16 is described using FIGS. 5 and 6.

FIG. 5 shows an example of document acquisition processing. In S101, a request to process a specific document, issued from the client system 12, is accepted by the WEB server 30, and a request to acquire the specific document is processed by the API service 32 through an application (S102). Next, in S103, an access right and status transition conditions on the document (or document set) to be acquired are checked by the management system 16. If the access is made from other than access right holders or the status of the document does not permit reference, error processing is performed in S104. On the other hand, in S105, the document is acquired from one of the business databases 14 by the management system 16, and after data conversion is performed in S106 as required, management information (e.g., log information) is recorded in S107, and in S108, the document is provided to the client system 12 that issued the acquisition request.

In the above processing, the client system need not recognize the location and registration attribute of the pertinent document to issue the acquisition request, as described above, and can acquire the pertinent document extremely easily. Also, when acquiring such a pertinent document, access right and status are checked in terms of the business process to which the pertinent document belongs. This provides security and also provides the advantage of ensuring process management.

FIG. 6 shows an example of document set printing. In S201, a request to print a document set from a client is accepted by the WEB server 30. In S202, the request is processed by the API service 32, and in S203, it is checked by the management system 16 whether the client issuing the request has an access right and the status permits printing. If the checking result is negative, error processing is performed in S204. On the other hand, if the checking result is positive, in S205, a pertinent document set is acquired from one of the databases and the documents are collectively printed.

Accordingly, users can be relieved from the conventional troublesome operations of individually printing and bundling documents and enjoy the advantage that business operations can be performed quickly and easily. Also, since access rights and statuses are checked as described above, there are the advantages that security can be obtained without fail and perfect printing management on business processes can be achieved.

FIGS. 5 and 6 illustrate part of functions of the management system 16, and of course, the management system has diverse functions as shown in FIG. 2. In either case, a variety of document services are integrated by the functions of the first interface part 18 and the second interface part 20 shown in FIG. 1, and document management is performed in terms of business processes. Therefore, rational document management in intimate contact with business can be achieved beyond the scope of mere document management. Accordingly, according to the document service integrated system 10 of the present embodiment, there are the advantages that a new business system that has not conventionally been found can be built, and efficient business processes can be built on the business system. A document service integrated system of the present embodiment can be used as a comprehensive business support system including product development, product sales, maintenance, product repairing, and the like. On the other hand, there are the advantages that the document service integrated system is also applicable to small-scale businesses and excellent in expandability and flexibility.

As has been described, according to the present invention, diverse document services relating to business processes can be integrated to support the business processes and achieve rational document processing.

The entire disclosure of Japanese Patent Application No. 2000-026880 filed on Feb. 4, 2000 including specification, claims, drawings and abstract is incorporated herein by reference in its entirety.

What is claimed is:

1. A document service integrated system provided between at least one client to use documents and at least one database to manage the documents, the system comprising:
    a management part having a control part that integrally manages various documents managed by the database according to a business process, and a processing part that processes a document operation request from the client, wherein:
        the control part has a first table in which a definition to associate plural documents is stored for the business process, and
        the control part has a second table in which a status transition definition in the business process is stored;
    a first interface part that establishes an interface between the client and the management part; and
    a second interface part that establishes an interface between the database and the management part.

2. The document service integrated system according to claim 1, wherein:
    the processing part processes the document operation request according to the definition associated with plural documents.

3. The document service integrated system according to claim 2, wherein the processing part has a function of searching documents according to the association definition.

4. The document service integrated system according to claim 2, wherein the processing part has a function of collectively printing plural documents mutually associated, according to the association definition.

5. The document service integrated system according to claim 1, wherein:
the processing part processes the document operation request according to the status transition definition.

6. The document service integrated system according to claim 5, wherein:
the control part has a third table in which a correspondence between a role name and a user name is defined;
the status transition definition can contain the role name; and
the processing part processes the document operation request according to the status transition definition and the correspondence.

7. The document service integrated system according to claim 1, wherein:
the control part has a fourth table in which a definition of data format conversion among plural applications is stored; and
the processing part, according to the definition of data format conversion, converts a document of a first data format created by a first application to a document of a second format and passes the document of the second data format to a second application.

8. The document service integrated system according to claim 1, wherein:
the control part has a fifth table in which a publicity range definition for each document are stored; and
the processing part limits access to documents according to the publicity range definition.

9. The document service integrated system according to claim 1, wherein:
the management part has a log recording part that records a log on a series of document operations in the business process.

10. The document service integrated system according to claim 1, wherein:
the control part integrally manages the various documents managed by the database according to a plurality of business processes;
the first table of the control part stores definitions that associate plural documents for business processes, wherein each definition is associated with plural documents; and
the processing part processes the document operation request according to the definitions associated with plural documents.

11. The document service integrated system according to claim 1, wherein:
the control part integrally manages the various documents managed by the database according to a plurality of business processes;
the control part has a second table in which a status transition definition in at least one business process is stored; and
the processing part processes the document operation request according to the status transition definition.

12. A document service integrated system that can connect documents to plural clients using them on various applications, and to plural databases managing the documents, the system comprising:
a management part having a control part that integrally manages various documents managed by the databases according to business processes, and a processing part that processes document operation requests from the clients, wherein:
the control part has a first table in which a definition to associate plural documents is stored for business processes, and
the control part has a second table in which a status transition definition in business processes is stored;
a first interface part that establishes an interface between the applications and the management part; and
a second interface part that establishes an interface between the databases and the management part.

13. The document service integrated system according to claim 12, wherein the first interface part has a function of interpreting an instruction following a predetermined application interface rule.

14. The document service integrated system according to claim 12, wherein the second interface part is constituted of plural facility handlers provided corresponding to individual databases.

15. A medium storing a computer-readable program used in a document service integrated system provided between at least one client using documents and at least one database managing the documents, the program comprising:
a management function that manages various documents managed by the database according to a business process and that has a control part, wherein:
the control part has a first table in which a definition to associate plural documents is stored for the business process, and
the control part has a second table in which a status transition definition in the business process is stored; and
a processing function that processes a document operation request from the client.

* * * * *